United States Patent [19]
Brown et al.

[11] Patent Number: 5,149,490
[45] Date of Patent: Sep. 22, 1992

[54] METHOD AND APPARATUS FOR REPLACING A NOZZLE

[75] Inventors: Steve K. Brown, Lynchburg; Larry D. Dixon, Forest; Samuel J. Moses, Lynchburg, all of Va.

[73] Assignee: B&W Nuclear Service Company, Lynchburg, Va.

[21] Appl. No.: 809,360

[22] Filed: Dec. 17, 1991

[51] Int. Cl.⁵ .............................................. G21C 13/00
[52] U.S. Cl. .................................... 376/260; 376/307; 29/890.031
[58] Field of Search ......................... 376/307, 260, 203; 165/104.27, 104.32; 29/402.02, 402.06, 402.07, 402.08, 890.031, 890.038, 890.043, 906; 228/119

[56] References Cited

U.S. PATENT DOCUMENTS

| | | | |
|---|---|---|---|
| 4,255,840 | 3/1981 | Loch et al. | 376/307 |
| 5,091,140 | 2/1992 | Dixon et al. | 376/260 |
| 5,094,801 | 3/1992 | Dixon et al. | 376/307 |

Primary Examiner—Daniel D. Wasil
Attorney, Agent, or Firm—Robert J. Edwards; D. Neil LaHaye

[57] ABSTRACT

A method and apparatus for replacing a nozzle or heater sleeve in a nuclear reactor coolant system pressurizer. The tubular main body portion of the replacement nozzle is threadably received in the nozzle bore after the original heater and damaged heater sleeve have been removed and the nozzle bore partially tapped to provide a threaded area therein. The first or upper end of the main body portion is positioned substantially flush with the interior of the pressurizer. A seal weld is provided between the upper end of the main body portion and the interior of the pressurizer. A flange that extends radially from and adjacent the second or lower end of the main body portion bears against the exterior of the pressurizer when the main body portion is in its installed position inside the heater sleeve bore.

4 Claims, 1 Drawing Sheet

METHOD AND APPARATUS FOR REPLACING A NOZZLE

BACKGROUND OF THE INVENTION

1. Field of the Invention

The present invention is generally related to nuclear system pressurizers and in particular to the replacement of nozzle or heater sleeve penetrations in the pressurizers.

2. General Background

The pressurizer in a nuclear reactor coolant system establishes and maintains the reactor coolant system pressure within the prescribed limits of the system. It provides a steam surge chamber and a water reserve to accommodate reactor coolant density changes during operation. A typical pressurizer is a vertical, cylindrical vessel with replaceable electric heaters in its lower section. The electric heaters are positioned below the normal water line and are actuated to restore normal operating pressure when the pressure in the reactor coolant system has decreased. The pressurizer also contains a plurality of nozzles at various locations for purposes such as sensing the liquid level or temperature in the pressurizer.

The electric heaters are comprised of a plurality of heating elements that extend through nozzles or sleeve penetrations through the wall of the pressurizer. Support plates inside the pressurizer are provided with holes in coaxial alignment with the holes in the pressurizer wall and the sleeves for receiving and supporting the heating elements. The sleeves extend outward from the pressurizer to provide exterior support to the heating elements. Due to the operating environment, it is a common requirement that heating elements and the sleeves through which they extend be replaced. Because alignment between the support plate holes and the sleeve is critical, it has previously been required that the replacement sleeve be fabricated to original design dimensional specifications and installed into the original bore in the pressurizer wall to insure proper alignment of the sleeve inner diameter with the corresponding support plate hole after welding. This process required that the removal of the original sleeve weld and installation of the repair weld be performed from inside the pressurizer because the bore through the pressurizer could not be enlarged for tooling access without potentially altering the alignment of the heater penetration with respect to the holes in the support plates. It is also a common requirement that nozzles used for penetration of level sensing and thermowell equipment into the pressurizer be replaced. Replacement of such nozzles presents very similar considerations and problems encountered when replacing heater sleeves. Since pressurizer components in nuclear power plants become radioactive after they have been in operation, performing such work inside the pressurizer is difficult and hazardous to personnel and thus impractical. Related patents that applicants are aware of include the following.

U.S. Pat. No. 4,255,840 discloses a method for replacing a defective immersion heater in a pressurizer. However, this patent is limited to the replacement of the heater and does not address the replacement of a nozzle.

U.S. Pat. No. 5,094,801 and 5,091,140 disclose an apparatus and method for replacing a heater sleeve. The original sleeve is removed and the original bore in the pressurizer is enlarged. An outer sleeve is installed in the bore with its upper end being seal welded to the cladding on the interior of the pressurizer. An inner sleeve in installed in the outer sleeve to extend into the pressurizer and is welded to the lower end of the pressurizer.

The known art addresses the replacement of the heater or the entire sleeve when the heater sleeve bore has been enlarged. The known art does not address the replacement of an entire nozzle or heater sleeve when enlargement of the bore is not required. Therefore, there exists a need for a replacement nozzle/sleeve that may be relatively easily and quickly installed when the bore has not been enlarged and for a replacement nozzle/sleeve that maintains the original heater alignment.

SUMMARY OF THE INVENTION

The present invention addresses the aforementioned need in a straightforward manner. What is provided is a replacement nozzle that can be easily inserted and secured and has the added advantage of being removable. The damaged original heater sleeve is removed. The nozzle bore is partially tapped to provide threads near its lower end. The replacement nozzle is threaded into the heater sleeve bore such that the upper end of the replacement nozzle is substantially flush with the interior of the pressurizer. A flange that extends radially from the replacement nozzle is positioned thereon so as to tightly engage the exterior surface of the pressurizer when the replacement nozzle is in its properly installed position. A weld prep at the lower end of the replacement nozzle may be used for attaching a heater and any necessary piping. The single seal weld allows replacement within a relatively short time and removal of the sleeve in a short period of time since only one seal weld must be broken.

BRIEF DESCRIPTION OF THE DRAWINGS

For a further understanding of the nature and objects of the present invention reference should be had to the following description taken in conjunction with the accompanying drawings in which like parts are given like reference numerals, and wherein.

DETAILED DESCRIPTION OF THE PREFERRED EMBODIMENT

Figure 1:
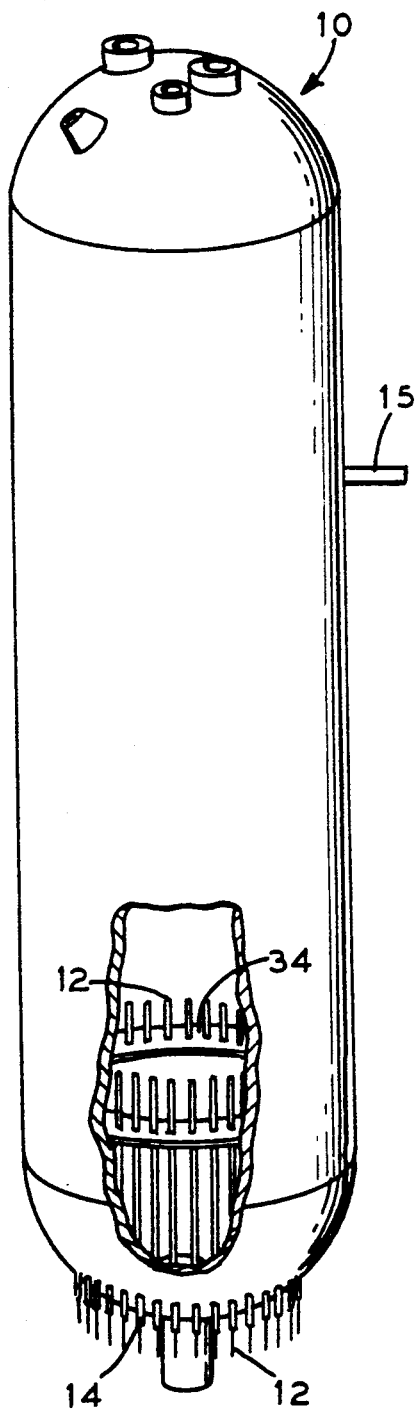
FIG. 1 is partial cutaway view of a typical pressurizer in a nuclear reactor coolant system.
Figure 2:
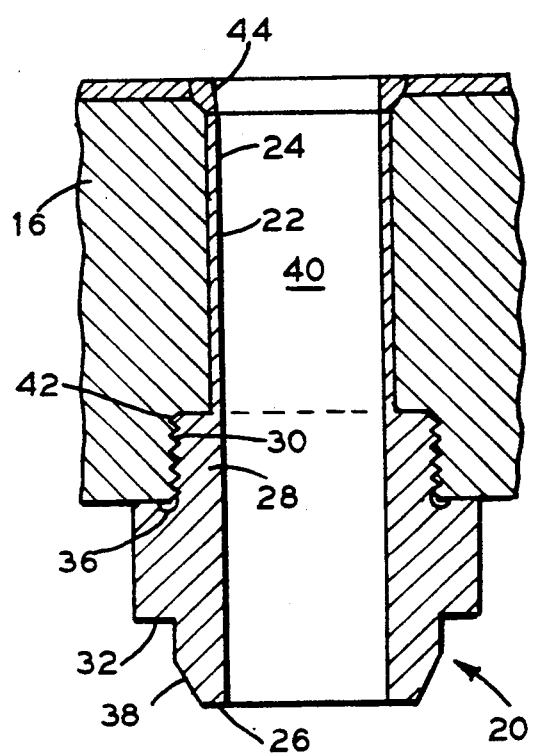
FIG. 2 is a detailed sectional view illustrating the invention in its installed position.

FIG. 1 illustrates a typical pressurizer 10 used in a nuclear reactor coolant system. Pressurizer 10 is a vertical, cylindrical vessel with replaceable electric heaters 12 in its lower section. Heaters 12 extend through heater sleeves 14 in the vessel wall 16 into the lower portion of pressurizer 10. Heaters 12 are supported by support plate 34 inside pressurizer 10. Heater sleeves 14 extend through the vessel wall 16 which is approximately six inches thick and made of carbon steel or low alloy steel. A plurality of nozzles such as that indicated by the numeral 15 may also extend through a bore in the vessel wall at a variety of locations on the pressurizer. Only one is shown for ease of illustration. As seen in FIG. 2, a cladding 18 normally made from stainless steel is used on the interior surface of the wall 16 for corrosion protection. For ease of illustration, heater 12 is not shown in FIG. 2. For purposes of simplicity, the following description is directed to the replacement of a heater sleeve.

As seen in FIG. 2, the invention is generally indicated by the numeral 20. Replacement heater sleeve 20 is formed from a tubular main body portion 22 having first or upper and second or lower ends 24, 26. The lower central section of main body portion 22 is provided with enlarged wall portion 28 having a larger outer diameter than main body portion 22. The outer circumference of enlarged wall portion 28 is provided with threads 30. Flange 32 extends radially outward from main body portion 22 immediately below and to a larger outer diameter than enlarged wall portion 28. Relief groove 36 is provided at the intersection of enlarged wall portion 28 and flange 32. Weld prep 38 is provided at lower end 26 for attaching the replacement heater or any necessary piping.

Figure 3:
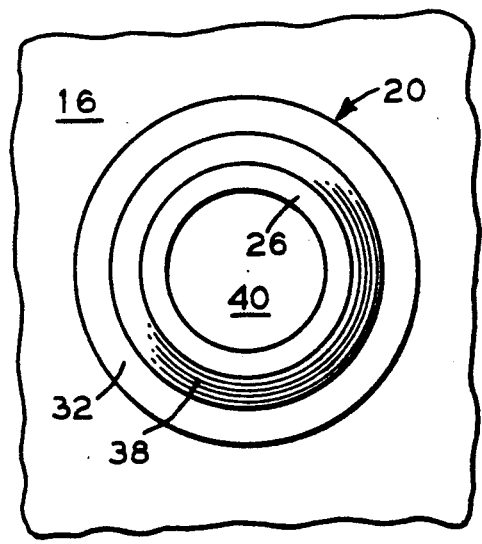
FIG. 3 is a plan view of the invention in its installed position.

Replacement of a damaged original heater sleeve 14 is carried out as follows. The electric heater 12 is removed. The damaged heater sleeve 14 is removed. Heater sleeve bore 40 is partially tapped to provide threads 42 at its lower end. Replacement heater sleeve 20 is threaded into heater sleeve bore 40 such that upper end 24 is substantially flush with the interior of pressurizer 10 and the upper face of flange 32 is against the exterior of pressurizer 10. Seal weld 44, a partial penetration weld, is then provided between upper end 24 and the interior of pressurizer 10. FIG. 3 provides a plan view of replacement heater sleeve 20 in its installed position. It should be understood that references to upper and lower ends of elements are a matter of convenience and should not be construed in a limiting fashion. Relief groove 36 serves the purpose of preventing interference between the intersection of enlarged wall portion 28 and flange 32 with threads 30 and 42 as flange 32 is caused to bear against the exterior of pressurizer 10. A replacement heater is then installed through replacement heater sleeve 20. The replacement heater is welded in place utilizing weld prep 38. The use of a replacement heater sleeve that has the same inner diameter as the original heater sleeve and can be installed in the original heater sleeve bore maintains the original heater alignment and precludes the need for special alignment procedures. The surface of flange 32 that contacts the exterior of pressurizer 10 is shaped to closely match the contour of that portion of pressurizer 10 where the work is being performed. A washer may also be used between flange 32 and the exterior of pressurizer 10 to aid in providing a sealing contact.

It should be understood that the method and apparatus described and illustrated are applicable to the replacement of a heater sleeve or a nozzle. The terms heater sleeve and nozzle should be considered as interchangeable for the purposes of this description since it is common in the industry to refer to a heater sleeve as a heater nozzle. Therefore, reference to the replacement of a nozzle in the claims should be understood as being applicable to a nozzle or a heater sleeve.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method of replacing a damaged nozzle in a nuclear reactor coolant system pressurizer wherein the nozzle extends into the pressurizer through a nozzle bore in the wall of the pressurizer, comprising:
   a. removing the damaged nozzle;
   b. partially tapping the nozzle bore to provide threads therein;
   c. threading a replacement nozzle having first and second ends and a flange extending radially therefrom and adjacent the second end of said replacement nozzle into the nozzle bore such that the first end of said replacement nozzle is substantially flush with the interior of the pressurizer and the flange is against the exterior of the pressurizer; and
   d. providing a seal weld between the first end of said replacement nozzle and the interior of the pressurizer.

2. In a nuclear reactor coolant system pressurizer wherein an original nozzle has been removed and the nozzle bore partially tapped to provide threads therein, a replacement nozzle, said replacement nozzle comprising:
   a. a tubular main body portion having first and second ends and threadably positioned inside the nozzle bore such that the first end of said main body portion is substantially flush with the interior of the pressurizer and the second end of said main body portion extends beyond the exterior of the pressurizer;
   b. said main body portion having a flange extending radially therefrom adjacent the second end of said main body portion; and
   c. a seal provided between the first end of said main body portion and the interior of the pressurizer.

3. The replacement nozzle of claim 2, wherein the flange on said main body portion bears against the exterior of the pressurizer when said main body portion is in its installed positioned inside the nozzle bore.

4. The replacement nozzle of claim 2, wherein said main body portion is provided with a weld prep adjacent its lower end.

* * * * *